Dec. 15, 1970   W. R. WOODWARD   3,548,227
ELECTROMAGNETIC LINEAR DRIVES
Filed April 3, 1969

United States Patent Office 3,548,227
Patented Dec. 15, 1970

3,548,227
ELECTROMAGNETIC LINEAR DRIVES
Walter R. Woodward, Carlisle, Mass., assignor to USM Corporation, Flemington, N.J., a corporation of New Jersey
Filed Apr. 3, 1969, Ser. No. 813,817
Int. Cl. H02k 7/08
U.S. Cl. 310—83                                    6 Claims

ABSTRACT OF THE DISCLOSURE

A magnetic field effects a continuous wave of radial deflection in a tubular flexspline thereby reacting it on a stationary circular spline and rotating the flexspline and a coaxial cylinder which houses a ball nut and cooperating screw. The ball nut is secured in the cylinder against translation thereby causing the screw (which is held against rotation) to be axially guided in translation according to electrical input to the field. Thus a compact electric assembly provides reversible, precise linear positioning.

BACKGROUND OF THE INVENTION

This invention pertains to an electromotive positioning device, or electromagnetic means for exerting a force in either direction along an axis.

In U.S. Letters Patent No. 3,169,202, granted Feb. 9, 1965, in the names of H. W. Proctor et al., there is disclosed an "Electromagnetic Actuator Having Continuously Rotating Field." As there shown an electromagnetic form of harmonic drive actuator propagates a circumferential strain wave in a flexible tubular member to provide a continuous rotary output some what in the manner of a synchronous motor. For providing a stepped rotary output, U.S. Letters Patent No. 3,169,201 and 3,331,974 (having common assignee with the Pat. 3,169,202 and the present application) also disclose the usage of a deflectible rotor. The present invention, recognizing the inherent advantages of harmonic drive actuation such as high reduction ratio with very low backlash, greatly reduced size and weight, together with high torsional rigidity, effectively employs these characteristics to provide a precision linear drive that is both simple and compact, and may have its field energized either by continuous input voltage for continuous linear drive, or by discrete pulsed signals for stepped linear drive.

SUMMARY OF THE INVENTION

The present invention is advantageously combining electromagnetic harmonic drive principles with those of a nut-screw device provides a compact electrically operated unit for effectively converting high speed, inertialess migration of the zones of excitation of a magnetic field to rectilinear movement through compound reduction gearing. A primary object of the invention accordingly is to provide a versatile linear positioning mechanism. A further object is to provide an improved assembly, compact and powerful, for precision electrical control of the linear movement of a member, the assembly having good position holding capacity and not ordinarily requiring the inclusion of magnetic braking. As herein shown, the output member preferably is an axially movable screw of a ball-nut screw device. A housing for the stator coaxially supports a rotor assembly which comprises a tubular flexspline secured externally on a sleeve itself anchored against translation in the housing and adapted to guide the screw in translation therein, the ball-nut being rotated with the sleeve while held therein against translation.

BRIEF DESCRIPTION OF THE DRAWINGS

The foregoing and other features of the invention will now be more particularly described as applied in an illustrative embodiment, for instance a device for linearly positioning a component-carrying member slidable along an axis, and with reference to the accompanying drawings thereof, in which.

DESCRIPTION OF THE PREFERRED EMBODIMENT

Figure 1:
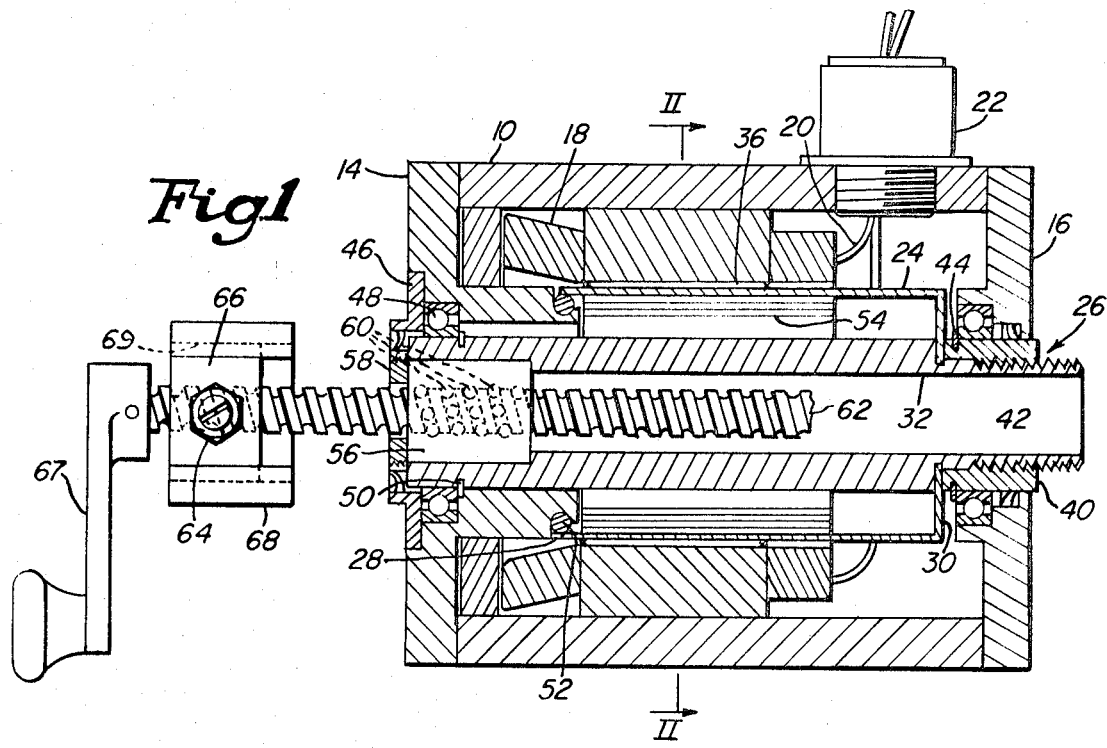
FIG. 1 is a view in axial section.

A stationary housing 10 is preferably formed with external heat dissipating fins 12 (FIG. 2) and includes end caps 14, 16 (FIG. 1). For energizing a stator 18 secured in the housing 10 to provide a "rotating" magnetic field, i.e. a migrating zone of excitation, in the stator winding (which usually employs six or more salient poles), wires 20 extend therefrom through a conduit 22 in the housing to a suitable driving circuit (not shown), for instance, of the type disclosed in U.S. Letters Patent No. 3,402,334, issued Sept. 17, 1968 in the name of G. C. Newton, Jr., if stepping drive is desired, or to a source of current for providing a continuous, reversibly rotating flux field. In the present case the field does not in fact rotate, but circumferential progression or stepping of localities of excitation in the stator does occur. It will accordingly be understood that the stator 18 provides circumferentially stepped localities of excitation and hence a magnetic field operable about the axis of a coaxial flexspline 24 mounted as will next be described, and capable of radially deflecting progressive opposed circumferential portions of the flexspline into reactive engagement with the stator.

The flexspline 24 constitutes a portion of a rotor assembly generally designated 26. As usual in harmonic drive actuator construction the flexspline is tubular and has a radilly deflectible open end portion 28 and a closed end 30, the later being secured to a coaxial guide sleeve 32 for purposes hereinafter to be explained. To provide relative rotary drive to the flexspline its portion 28 is provided with external longitudinal spline teeth 34 arranged to mesh, usually in uniformly spaced circumferential localities with similar spline teeth 36, greater in number than the teeth 34, formed internally on the stator 18.

As will be understood from the above-mentioned patents and such basic earlier disclosures of mechanical harmonic drive actuators as U.S. Letters Patent 2,906,143, issued Sept. 29, 1959, a rotary strain wave circumferentially effected in a tubular flexspline (such as generated by an elliptical wave generating cam or, as in this application, by a "rotating" magnetic field of the stator acting on a magnetically responsive flexspline) not only deflects the flexspline teeth 34 radially for meshing at spaced circumferential localities with the spline teeth 36, the latter being on a slightly larger pitch diameter, but also propagates the localities of meshing. Since the non-deflecting ring of the stator teeth 36 are non-rotating and greater in number than those of the flexspline by a multiple of the number of localities of tooth engagement between the two, the flexspline in its deflected localities reacts on the stator teeth and rotates at a reduced speed. The gear ratio is determined by the gear diameter and the deflection imparted, the smaller the deflection relative to the diameter, the higher the gear ratio.

The rotor assembly 26 is supported in the end caps 14, 16 and held against relative translation as will now be described. Abutting the end 30 of the flexspline is a clamping nut 40 threaded onto a reduced end of the guide sleeve 32. A ball bearing 42 is axially held in a recess of the end cap 16 by a retaining ring 44 snapped into a circumferential groove of the nut 40. The end cap 14 threadedly receives a nut 46 for restraining a ball bearing 48 against an internal shoulder formed in the cap 14, and a snap ring 50 externally seated in the guide sleeve 32 bears on the inboard side of the bearing 48 to lock the sleeve against axial displacement.

A semi-resilient ring or disc 52 (FIG. 1) disposed on the inner circular hub of the end cap 14 dampens excessive motion of the flexspline and maintains the spline meshing localities uniformly spaced. Also, in common with electromagnetic harmonic drives of prior design above cited, a coil 54 of deflectible shim stock for aiding in providing optimum paths for magnetic flux is desirably included in the rotor 26 within the flexspline.

For rotating with the guide sleeve 32 a non-translatory ball-nut 56 (FIG. 1) is clamped against an internal shoulder of the sleeve by an annular nut 58 threaded into an end of the sleeve. Antifriction balls 60 of the ball-nut cooperate with helical threads of a screw 62 axially extending in the sleeve, and longitudinally movable in either direction along its axis. For preventing the screw 62 from moving wholly through the ball nut 56 a limit stop (not shown) may be mounted at one end thereof or at some adjustably selected point. The screw 62 is shown threadedly extending through a non-rotary slide 66 fitted in a guideway 69 of a stationary block 68, but it will be apparent that the screw may be connected for linear operation of any desired element in lieu of the slide 66.

Figure 2:
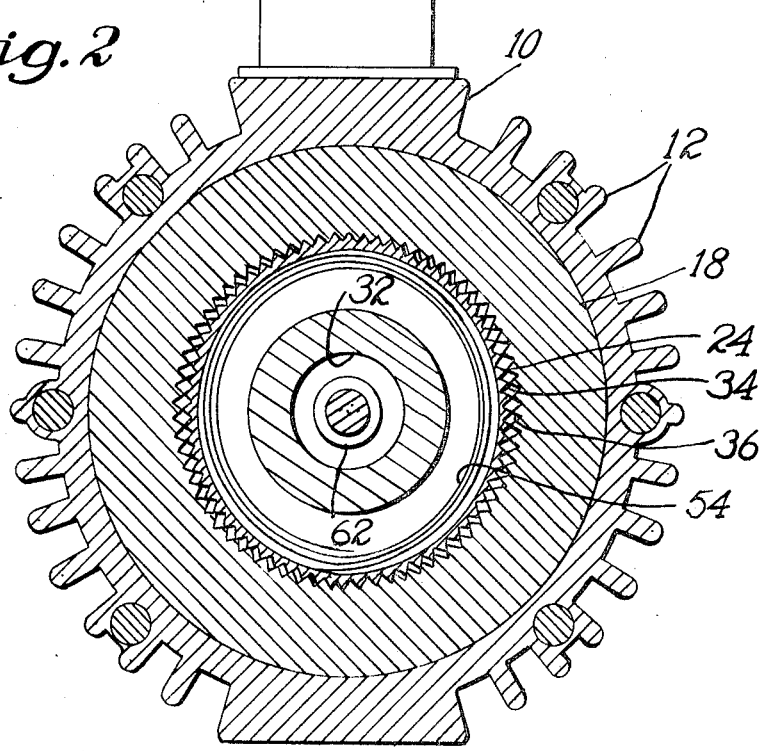
FIG. 2 is a transverse section taken on the line II—II of FIG. 1.

Operation of the linear positioning device is essentially the same whether the slide 66 is to be linearly driven by a continuous input voltage rotating the magnetic field of the stator 18 or the latter is energized by discrete stepping signals. Meshing engagement of the differential spline teeth 34, 36 at circumferentially spaced localities, such as at the vertical major axis of the flexspline 24 as shown in FIG. 2, is progressed as that axis rotates. Hence, the stator 18 itself being stationary, the flexspline is rotated at reduced speed in a direction opposite to that of the excitation of the field and correspondingly rotates the ball-nut 56. The screw 62 being held against rotation is accordingly moved linearly to shift the slide 66 to the right or left as controlled by the electrical input.

A stop screw 64 in the slide 66 is provided to engage the screw 62 and hold it against turning when the slide is in a desired position. Optionally, a manual input to the screw 62 may be provided as by means of a crank 67 which of course may be readily detachable. Advantageously the crank 67 may be operated independently and/or in addition to the electrical input without causing damage despite continuous energization of the stator 18 thereby facilitating axial positioning.

It will be appreciated that the compact assembly described is of simple, reliable structure and capable of precise positioning of the slide 66 along an axis. Moreover, by reason of the initial harmonic drive reduction coupled with powerful low friction ball-nut screw operation, the screw 62 is translated smoothly and inertia is negligible. Numerous alternative arrangements of the elements may be had without departing from the scope of the invention. For instance, when preferred the ball-nut 56 may become the linearly moved element held against rotation, and the screw 62 is then rotatably driven but held against translation.

Having thus described my invention, what I claim as new and desire to secure by Letters Patent of the United States is:

1. An electromagnetic linear positioning device comprising a stationary housing, an electromagnetic harmonic drive means therein which includes a stator, means for energizing the stator, and a rotor assembly driven thereby, and a ball-nut-screw operatively connected in coaxial relation to the rotor assembly to rotate either the ball-nut or the screw, the other of said ball-nut and said screw being non-rotatably mounted for movement in translation.

2. A device as set forth in claim 1 wherein the rotor assembly includes a guide sleeve rotatably journaled in the housing for rotating the ball-nut of the ball-nut-screw, and the screw is guided for axial movement in the guide sleeve.

3. An electromagnetic linear positioning means comprising a stationary housing having opposed end caps, a stator in the housing and energizable to provide a circumferentially stepped magnetic field, said stator including circumferential spline teeth, a rotor coaxially disposed in the stator and including a sleeve journaled in the end caps and a tubular flexspline coupled to the sleeve and formed with circumferential external spline teeth for progressively meshing with said stator spline teeth, a ball-nut rotatably driven with said sleeve in one end thereof and held against translation, and a screw coaxially disposed in the sleeve for cooperation with the ball-nut and held against rotation during relative translation.

4. A positioning means as set forth in claim 3 wherein means is provided for holding the screw against rotation, and manually operable means is connected to the screw for rotating it when said holding means is inoperative.

5. A linear positioning device comprising a cylindrical housing, a rotor coaxially journaled in the housing, and including a ball-nut and a flexspline coupled thereto, a stator secured to the housing and energizable to provide circumferential progression of localities of excitation, the flexspline and the stator being formed with circumferential spline teeth meshing at circumferential localities in response to the stator excitation, and a non-rotary screw extending coaxially in the housing and cooperative with the ball-nut for relative movement in translation in either axial direction.

6. A device as set forth in claim 5 wherein means is provided for holding the screw in a selected axial position.

References Cited

UNITED STATES PATENTS

| | | | |
|---|---|---|---|
| 3,169,202 | 2/1965 | Proctor et al. | 310—83 |
| 2,696,579 | 12/1954 | Van Der Veer. | |
| 3,169,201 | 2/1965 | Spring et al. | 310—83 |
| 3,331,974 | 7/1967 | Proctor | 318—138XR |
| 3,159,758 | 12/1964 | Hemperly et al. | 310—83 |
| 2,482,464 | 9/1949 | Chapman. | |
| 2,446,393 | 8/1948 | Russell. | |
| 2,956,188 | 10/1960 | White | 310—83XR |
| 2,860,266 | 11/1958 | Schrader | 310—83XR |

WARREN E. RAY, Primary Examiner

B. A. REYNOLDS, Assistant Examiner

U.S. Cl. X.R.

310—49, 15